United States Patent
Cheng et al.

(10) Patent No.: US 7,274,694 B1
(45) Date of Patent: Sep. 25, 2007

(54) DEFINING LINK AGGREGATION ACROSS A STACK

(75) Inventors: Linda Cheng, San Jose, CA (US); Scott Emery, Saratoga, CA (US); Stewart Findlater, Mountain View, CA (US); James P. Rivers, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1053 days.

(21) Appl. No.: 10/339,732

(22) Filed: Jan. 9, 2003

(51) Int. Cl.
*H04L 12/56* (2006.01)
(52) U.S. Cl. .................. 370/389; 370/392; 370/401
(58) Field of Classification Search ................ 370/389
See application file for complete search history.

(56) References Cited

U.S. PATENT DOCUMENTS

| | | | | |
|---|---|---|---|---|
| 5,740,171 A | * | 4/1998 | Mazzola et al. ............ | 370/392 |
| 5,959,968 A | * | 9/1999 | Chin et al. ................. | 370/216 |
| 6,163,543 A | | 12/2000 | Chin et al. | |
| 6,298,061 B1 | | 10/2001 | Chin et al. | |
| 6,473,424 B1 | | 10/2002 | DeJager et al. | |
| 6,535,510 B2 | * | 3/2003 | Kalkunte et al. ........... | 370/389 |
| 6,775,281 B1 | * | 8/2004 | Brown ....................... | 370/392 |
| 6,801,527 B1 | * | 10/2004 | O'Keeffe et al. ........... | 370/386 |
| 6,819,680 B2 | * | 11/2004 | Hickman et al. ........... | 370/475 |
| 7,023,797 B2 | * | 4/2006 | Tagore-Brage .............. | 370/230 |
| 7,111,101 B1 | * | 9/2006 | Bourke et al. .............. | 710/305 |
| 7,120,683 B2 | * | 10/2006 | Huang ........................ | 709/223 |

* cited by examiner

*Primary Examiner*—Wing Chan
*Assistant Examiner*—Robert C Scheibel
(74) *Attorney, Agent, or Firm*—Charles E. Krueger

(57) ABSTRACT

A cross stack port aggregation method and system associates a destination index with a received packet when it is provided to devices in the stack. Each device utilizes the destination index to access a descriptor identifying ports in the device included in the port aggregation group. An index generated from packet address data is used to select a bit in a group mask unique to each port.

22 Claims, 3 Drawing Sheets

| Number of ports in a group | group Mask port A | group Mask port B | group Mask port C | group Mask port D | group Mask port E | group Mask port F | group Mask port G | group Mask port H |
|---|---|---|---|---|---|---|---|---|
| 1 | 0000 | | | | | | | |
| 2 | 5555 | AAAA | | | | | | |
| 3 | 6DB6 | B6DB | DB6D | | | | | |
| 4 | 7777 | BBBB | DDDD | EEEE | | | | |
| 5 | 7BDE | BDEF | DEF7 | EF7B | F7BD | | | |
| 6 | 7DF7 | BEFB | DF7D | EFBE | F7DF | FBEF | | |
| 7 | 7EFD | BF7E | DFBF | EFDF | F7EF | FBF7 | FDFB | |
| 8 | 7F7F | BFBF | DFDF | EFEF | F7F7 | FBFB | FDFD | FEFE |

| Number of ports in a group | group Mask port A | group Mask port B | group Mask port C | group Mask port D | group Mask port E | group Mask port F | group Mask port G | group Mask port H |
|---|---|---|---|---|---|---|---|---|
| 1 | 0000 | | | | | | | |
| 2 | 5555 | AAAA | | | | | | |
| 3 | 6DB6 | B6DB | DB6D | | | | | |
| 4 | 7777 | BBBB | DDDD | EEEE | | | | |
| 5 | 7BDE | BDEF | DEF7 | EF7B | F7BD | | | |
| 6 | 7DF7 | BEFB | DF7D | EFBE | F7DF | FBEF | | |
| 7 | 7EFD | BF7E | DFBF | EFDF | F7EF | FBF7 | FDFB | |
| 8 | 7F7F | BFBF | DFDF | EFEF | F7F7 | FBFB | FDFD | FEFE |

DEFINING LINK AGGREGATION ACROSS A STACK

BACKGROUND OF THE INVENTION

Link aggregation is the combination of multiple physical ports coupled to the same system or group of systems to form a group of ports which can be treated as one single higher bandwidth port. This Layer 2 feature is commonly referred to in products manufactured by the assignee of the present application as Etherchannel.

In Etherchannel, and other link aggregation protocols, various physical ports in a switch are aggregated and mapped to a virtual port. High level switch management software is only aware of the virtual port. When a packet is transmitted from an egress virtual port, a port distribution protocol decides which one of the aggregated physical ports mapped to the virtual port is to transmit the packet. In conventional implementations of the distribution protocol the number of ports to be aggregated must be a power of two because the port selector is a binary number.

Stacking is the ability to manage a group network devices, such as switches, as a single unit. Stackability gives multiple physical switches the appearance of one large physical switch. The stacked switches may be coupled using various technologies including a connection between network ports, a connection between dedicated stacking ports, or a connection utilizing a specialized stacking bus. Stacking is advantageous in creating a switch with a large number of ports which can be managed utilizing a single interface.

It is usual for link aggregation group members to be restricted to a single switch (e.g. in the Catalyst 2900 XL, 3500 XL, 4000, 5000, and 6000 routing platforms manufactured by the assignee of the present application). In these systems stacking is done at the hardware level by connecting normal high bandwidth network ports together and no proprietary information relating to link aggregation is passed in the layer 2 header across links connecting two switches in a stack. Thus, in existing systems it is not possible to mark packets which belong to a link-aggregation group when they pass across the stack.

Accordingly, conventional link-aggregation protocols and stacking architectures are not designed to allow fully configurable link-aggregation across the stack.

BRIEF SUMMARY OF THE INVENTION

In one embodiment of the invention, a method of link aggregation allows port-aggregation information to be communicated between stack members to facilitate cross-stack link aggregation.

In another embodiment of the invention, a destination index (destIndex) is accessed when a packet is received at a port in one of the switches in the stack. This destIndex is forwarded with the packet when it is sent to other switches in the stack.

In another embodiment of the invention, the physical port numbers of members of a stack are mapped to global port numbers so that each port in the stack is uniquely identified. Ports in a link-aggregation group are assigned sequential global port numbers which have their least significant bits masked to form the link-aggregation group port number. Thus, the ports included in the link-aggregation group may be identified as a group of ports or as single ports.

In another embodiment of the invention, each switch in a stack including ports in a link-aggregation group includes a port map accessed by the destIndex appended to a packet destined for the link aggregation group. The port map identifies which ports in the switch are included in the link aggregation group.

In another embodiment of the invention, each port included in a link aggregation group has a unique port mask assigned to it. The port masks are designed so that for a given bit position in the mask the bit held in the given bit position is cleared for only one of the port maps. An index is generated by hashing an address, or other data, included in the packet to select a bit position in the port mask. The port having a port mask with a selected bit value in the selected position transmits the packet.

In another embodiment of the invention, the port selection index is the CRC of either the MAC destination address, MAC source address, IP destination address, or the IP source address or of combinations of these addresses.

Other features and advantages of the invention will be apparent in view of the following detailed description and appended drawings.

DETAILED DESCRIPTION OF THE INVENTION

Figures 1, 3:
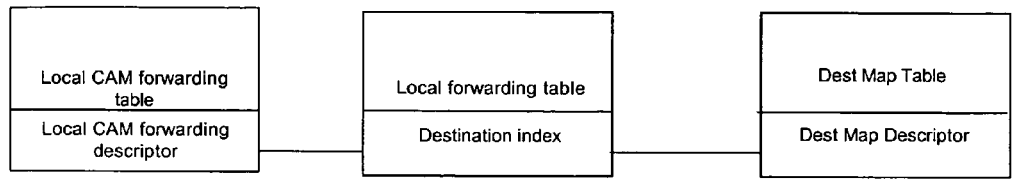
FIG. 1 is a block diagram of a set of tables.
FIG. 3 is a table listing group masks utilized in an embodiment of the invention.

The invention will now be described with reference to several embodiments. One embodiment is described, by way of example, not limitation, in the context of switch hardware and a link aggregation protocol designed by the assignee of the present application. One of ordinary skill in the art will realize that the invention is applicable to other switching platforms and link aggregation protocols.

A flexible way to perform link aggregation on ports which do not reside in the same physical box in a stack will now be described. This embodiment allows a variable number of link aggregation groups where the number of groups is only limited by the total number of ports allowable in the stack. This embodiment also allows the number of ports being aggregated to be a non-multiple of two. In addition, it includes a numbering scheme for port identification which is efficient for systems which do searches and functions based on both the physical and logical port number.

In the context of the present embodiment, a stack may be either a number of switches implemented as boxes, which are stacked by connecting the boxes with a bus or cables, or number of Ethernet ASICs included in a single box and coupled by a bus. In the following the term switch is used to include both the box and ASIC implementations as well as other implementations of stackable switches. The important feature is that the stack functions as a single switch and packets received at a port in any one of the stacked switches can be switched to any other physical port in the stack.

The following is a brief overview of one embodiment. For each packet entering the network device, a decision is made about its destination(s). This destination then is represented by a destination index (destIndex). The destIndex travels with the packet across the stack in a header to one or more destination devices. This can be another ASIC in the same box or another box. Each destination uses the destIndex to look up a port map which tells the device which port(s) the packet will be transmitted on. One advantage of this embodiment is that ports on multiple devices may be represented with a single destIndex. Each destination device interprets the destIndex in a way which makes sense for itself. A destination which owns two of four possible ports in a link aggregation group will have two bits set in its port map.

When the packet is received on a port, a logical port number is assigned to it which represents the physical port on which it was received. A small range of contiguous logical port numbers is chosen to represent the link aggregation group. This makes it easy to mask off the least significant bits (e.g. 3 in the case of 8 ports) to use in searches and other required functions.

Each physical port in a switch is usually assigned a port number, e.g., 0-25. However, when switches are stacked and the ports are to be aggregated a different numbering system is utilized so that each port in the stack has a unique logical number. In the preferred embodiment management software assigns a global port number to each port. In this embodiment, when ports are to be aggregated the physical ports to be aggregated are assigned sequential global port numbers which are then masked during a CAM look-up. For example, assume that four physical ports are to be aggregated. These ports could be assigned the logical port numbers: 10002; 10012; 10102; and 10112. If the two LSBs are masked then group address 10xx (where x=don't care) is used during CAM searches and other required functions. For example, during the learning phase when the switch is building the forwarding tables, management software desires to treat the aggregated ports as one unit. Addresses are learned on the group of aggregated ports, not the individual ports. During a table search done for learning, the least significant bits are masked off.

Giving the ports in a port group sequential logical port numbers is preferable to giving all the ports the same logical port number because the ports can still be distinguished from each other for features unrelated to link aggregation. If a packet is received on a physical port included in an aggregation group is forwarded to management software it can identify the specific port in the aggregation group.

The destIndex of the present embodiment will now be described with more detail with reference to FIG. 1. In this embodiment, when a packet is received fields in the packet, such as the destination MAC, and the ingress port number are used as a key to a lookup in the CAM (content addressable memory) to access an index to the Local Forwarding Descriptor table. The Local Forwarding Descriptor table will contain entries for each destination address. The entries in the Local Forwarding Descriptor table contain information for packet forwarding and a destIndex. The destIndex is used to access a descriptor in the Destination Map Table. The entries in the various tables are loaded during the learning phase and the set up of the port aggregation group.

The operation of the system depicted in FIGS. 1 and 2 will now be described. It is assumed in the current example that an aggregation group has been defined including ports in first and second switches 4 and 6 in a stack 2. The packet is received at the first switch 4 (the "ingress switch") and is transmitted from a port on the second switch 6 (the "egress switch"). The system also works the same if the packet is transmitted from a port on the first switch because as will become apparent the location of the transmit port does not affect the operation.

Figure 2:
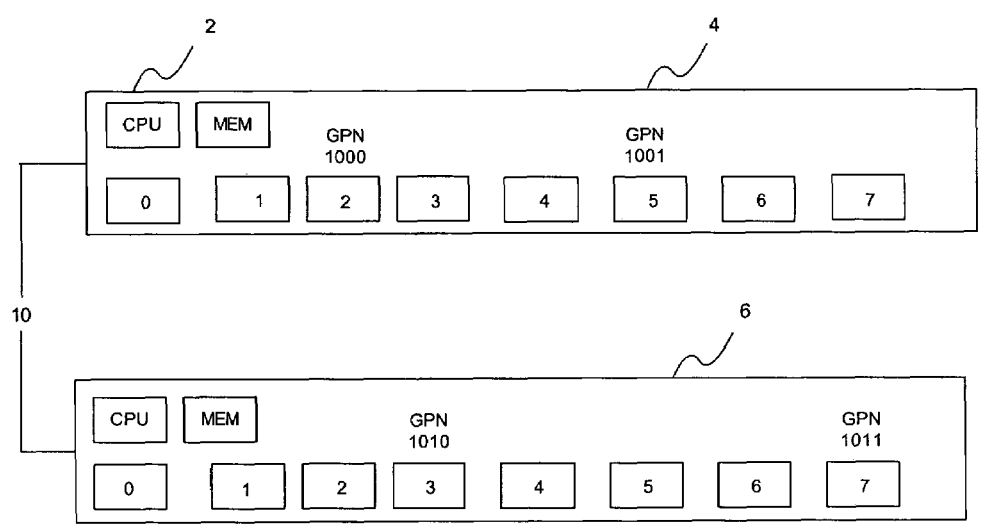
FIG. 2 is block diagram depicting two switches in a stack.

In this example, it is assumed, as depicted in FIG. 2, that two switches 4 and 6 each having eight physical ports are included in the stack 2 and that physical ports no. 2 and no. 5 on the first switch 4 and no. 3 and no. 7 on the second switch 6 are included in the aggregation group. The switches are connected by a cable 10 to form a stack. The following mapping of physical ports to global port numbers (switch number (SN), physical port number (PPN), global port number (GPN)) is made: (SN1, PPN2; GPN1000), (SN1, PPN5; GPN1001), (SN2, PPN3; GPN1010), and (SN2, PPN7; GPN1011). The link aggregation group address is formed by masking the first two LSBs and is equal to 10xx.

In the present embodiment, during L2 learning, a CAM match is based on a match between the source MAC address and the ingress global port number. During the learning mode, the ingress global port numbers are masked so that all ports in the group appear to have the same global port number, e.g., for the group described above, 10xx, so that all packets received at those ports having the same source MAC address will be mapped to the same CAM entry.

In this embodiment, the CAM match and lookups in the Local Forwarding Table are performed on the ingress side. The destIndex is an index into the Destination Map Table on each switch in the stack. This destIndex is included in a header appended to the received packet before it is provided to other switches in the stack. When the packet is received at a switch in the stack the destIndex is removed from the header. The use of the destIndex at each switch in the stack is the same, i.e., as an index to access a descriptor in the Destination Map Table.

One entry in the descriptor accessed from Destination Map Table on a particular switch in the stack is a port map having a bit position corresponding to each physical port number of the ports on that particular switch. Bit positions having a set bit indicate the physical port number of ports on the particular switch that are included in the port aggregation group. In this example, assuming each switch has 8 ports the port maps would be 8-bit fields with the port map for the first switch 4 having set bits only at bit positions 2 and 5 and the port map for the second switch 6 having set bits only at bit positions 3 and 7. Therefore the port map for the first switch is: $00100100_2$; and the port map for the second switch is: $10001000_2$.

The received packet will only be forwarded by one physical port in the link aggregation group. A distribution scheme is utilized to select this port. In the present embodiment, because the physical ports may be distributed among several ports in a stack the distribution scheme must be able to select a transmission port independent of the location of the port on the stack. As described above, the destIndex associated with the received packet accesses a descriptor from the Destination Map Table at each switch in the stack that includes a port map indicating which ports in the switch are included in the link aggregation group. As will now be described, this port map along with a group mask which is unique to each port in the group is used to select the egress port.

An embodiment of the distribution scheme will now be described. As described above, when ports are aggregated the actual physical packet is only transmitted by one of the aggregated physical ports. Subject to some limitations, a distribution algorithm determines which one of the physical ports will transmit the packet. The distribution algorithm may implement a semi-random selection of the aggregated physical ports or may implement a priority scheme. In the currently described embodiment each physical port of the aggregation group is assigned a group mask which is a 16-bit field.

In this embodiment, the group masks are configured so that for each bit position in the 16-bit field only one group mask will have a zero. For example, if two physical ports were included in the link aggregation group then the first and second group masks are: 01010101_01010101$_2$ and 10101010_101010102. Thus, for example, if the second bit position is selected only the bit in the first group mask is cleared so that the first port in the aggregation group would be selected. FIG. 3 depicts a table for configuring group masks for up to 8 physical ports in an aggregation group.

A 4-bit number is required to select one of the bits of the group mask. In the presently described embodiment this number is generated by hashing one or a group of selected addresses, including, for example, either destination or source MAC or IP addresses, included in the packet. The hashing function generates a four-bit CRC (cyclic redundancy code) of the selected address.

Figure 4:
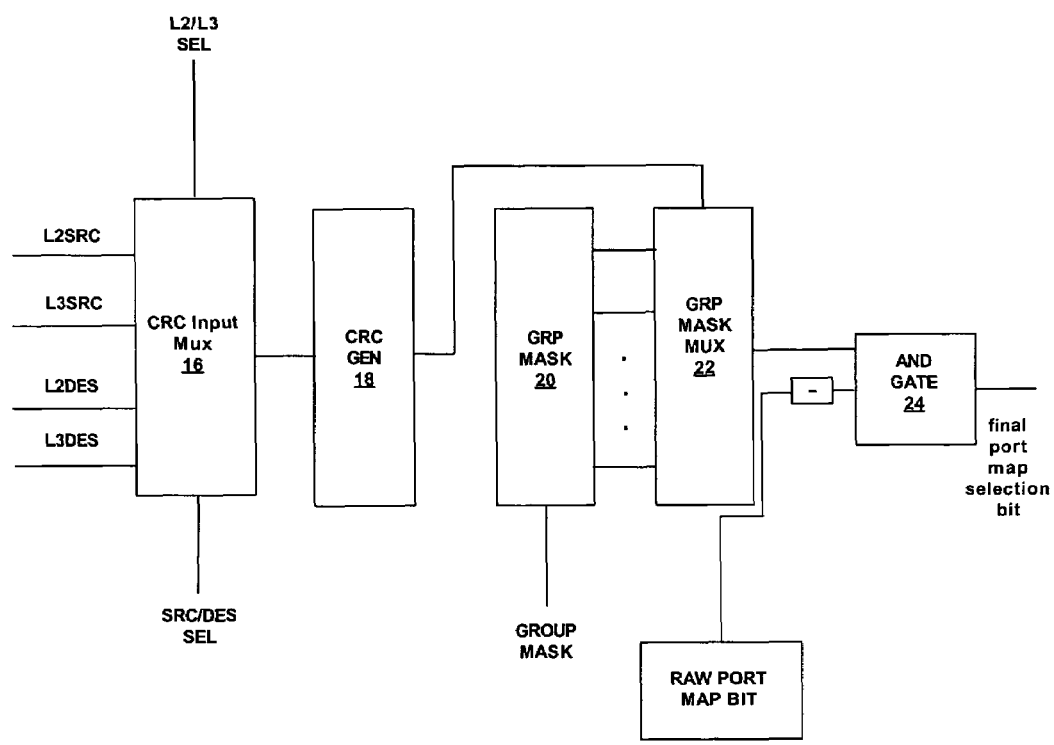
FIG. 4 is logic diagram of a system for selecting the egress port of a port aggregation group.

FIG. 4 is a schematic diagram of the logic for implementing the above-described distribution scheme at each port of an aggregation group. Referring to FIG. 4, which depicts the implementation at a particular port, a CRC input MUX is coupled to the input of CRC generator 18. The CRC input MUX has the packet L2 and L3 source addresses and the packet L2 and L3 destination addresses as inputs. The CRC input MUX has a level select input coupled to a L2/L3 select signal and a source/destination select input coupled to Src/Dest control signal.

A group mask register 20 holds the group mask for the particular port and each bit in the register is coupled to an input of a 16×1 group mask MUX 22. The selection input of the group mask MUX 22 is coupled to the output of the CRC generator 18 and the output of the group mask MUX 22 is coupled to a first inverted input of an AND gate 24. The second input of the AND gate 24 is coupled to the bit position in the raw port map corresponding to the particular port. The output of the AND gate is the final port map selection bit corresponding to the physical port.

The operation of the implementation of the distribution algorithm of the present embodiment will now be described. Since the particular port is included in the aggregation group its corresponding bit in the raw port map is set. The L2/L3 and Src/Dest control signals are set by the user to select whether the L2 source address, L3 source address, L2 destination address, or L3 source address will be hashed. The output of the CRC generator 18 selects one of the bits in the group mask of the port which is inverted and supplied to one input of the AND gate 24. If this inverted bit is a "1" then the AND gate is masked and the port map bit is "0" so the port is not selected by the distribution algorithm. If this bit is a "0" then the AND gate 24 is open and the port map bit is "1" so that the port is selected by the distribution algorithm as the egress port for the packet.

FIG. 4 depicts a hardware embodiment. However, as is well-known in the art each of the functional blocks depicted in FIG. 4 can be implemented in either hardware or software and the actual implementation of the system depicted in FIG. 4 can be a combination of hardware and software.

Thus, since the port map is unique to each device in the stack, the distribution algorithm can function on logical ports in different switches in a stack. This makes the scheme scalable since each device in the stack does not have to know about the other devices in the system. Also, for the particular hashing scheme described, if the hash is based on a source address then the same egress port will be selected for each packet having the same source address which can be advantageous for flow control. Finally, the distribution algorithm works for port aggregation groups with a number of ports not equal to a power of 2 because this distribution scheme does not directly select the port which will transmit the packet, but it selects a profile bit which determines if the port will transmit the packet. The profiles can easily allow for non-multiples of two aggregation.

Accordingly, a cross-stack link aggregation system and method has been described with no restriction on where in the stack members of a link aggregation group may reside. It is scalable in that there is no restriction to the number of link aggregation groups that may be created. There is no power of two restriction for number of group members. Required functions can easily be performed using the actual physical port or using the logical port number and operations on the group of ports can be performed using the set of logical port numbers.

Another advantage of the invention is that the source device (or ASIC) does not have to store information relating to all the destination ports (the other link aggregation group members). This greatly reduces the amount of information that must be maintained at the source device (or ASIC). Each source device (or ASIC) has to keep track only of its own ports and not all the ports on the other device (or ASICs) in the system.

The invention may be implemented as program code, stored on a computer readable medium, that is executed by a digital computer. The computer readable medium may include, among other things, magnetic media, optical media, electro-magnetic fields encoding digital information, and so on.

The invention has now been described with reference to the preferred embodiments and alternatives and substitutions will now be apparent to one of ordinary skill in the art. In particular, the particular hashing function and inputs to the hashing function described is not critical to practicing the invention. Further, the particular tables described utilize levels of indirection that are not critical to practicing the invention. The particular form of the group masks is given by way of example and other group mask implementations could be utilized. Further, the above embodiments have been described in terms of a stack of switches. However, the invention is applicable to stack of network devices including routers, gateways, bridges, etc. In addition, a link aggregation group can be defined by non-contiguous logical port numbers and the destination index can be associated with the received packet by standard means known in the art such as appending or prepending the data to the packet. Accordingly, it is not intended to limit the invention except as provided by the appended claims.

What is claimed is:

1. A method, implemented by management software on a plurality of devices included in a stacked set of devices, for creating a cross-stack port aggregation group including physical ports in at least two different devices in the stacked set of devices, with each device including a number of physical ports and a controller for executing management software, said method comprising the steps of:

assigning a logical port number to each physical port included in the port aggregation group;

assigning a unique group mask to each port in the port aggregation group;

utilizing packet data in a received packet to access a destination index;

associating the destination index with the received packet;

generating a port selection index based on a field included in the received packet;

providing the received packet and associated destination index to each potential destination in the stack;

at each device, utilizing the destination index to access a destination descriptor including a port map indicating which ports of the device are included in the port aggregation group;

at each device, for a selected port of the device, utilizing the port selection index, port map, and group mask for the selected device to determine whether to transmit the received packet from the selected port.

2. The method of claim 1 where the step of generating a port selection index further comprises the step of:

forming the CRC of one or more fields included in the packet.

3. The method of claim 1 where the step of assigning a group mask includes the steps of:

creating a set of group masks for each port where for a given bit position in the set of group masks only one group mask has a bit value indicating that the packet should be passed.

4. The method of claim 3 where the step of utilizing the port selection index further comprises the step of:

selecting a transmit bit position in the group mask for the selected port indicated by the port selection index;

transmitting the received packet from the selected port if the bit in the transmit bit position has a bit value indicating the packet should be passed.

5. The method of claim 1 where the step of assigning a logical port number includes the step of:

assigning sequential logical port numbers to members of the port aggregation group; and further comprises the step of:

masking least significant bits of logical port numbers during learning mode so that all ports in the cross-stack port aggregation group appear to have the same global port number.

6. The method of claim 1 further comprising the step of, at each device included in the stack:

utilizing a provided destination index to represent a unique set of destination ports at each device in the stack.

7. The method of claim 1 where the step of associating a destination index with a received packet further comprises the step of:

prepending or appending a header including the destination index to the received packet.

8. The method of claim 1 where the step of providing the received packet and destination index to each potential destination in the stack comprises:

providing the received packet and destination index to every member of the stack.

9. A system for creating a cross-stack port aggregation group including physical ports in at least two different devices in the stacked set of devices, with each device including a number of physical ports and a controller for executing management software, said system comprising:

means for assigning a logical port number to each physical port included in the port aggregation group;

means for assigning a unique group mask to each port in the port aggregation group;

means for utilizing packet data in a received packet to access a destination index;

means for associating the destination index with the received packet;

means for generating a port selection index based one or more fields included in the received packet;

means for providing the received packet and associated destination index to each potential destination in the stack;

means, at each device, for utilizing the destination index to access a destination descriptor including a port map indicating which ports of the device are included in the port aggregation group;

means, at each device and for a selected port of the device, for utilizing the port selection index, port map, and group mask for the selected device to determine whether to transmit the received packet from the selected port.

10. The system of claim 9 where the means for generating a port selection index further comprises the step of:

means for forming the CRC of one or more fields included in the packet.

11. The system of claim 9 where the means for assigning a group mask includes the steps of:

means for creating a set of group masks for each port where for a given bit position in the set of group masks only one group mask has a bit value indicating that the packet should be passed.

12. The system of claim 11 where the step of utilizing the port selection index further comprises the step of:

means for selecting a transmit bit position in the group mask for the selected port indicated by the port selection index;

means for transmitting the received packet from the selected port if the bit in the transmit bit position has a bit value indicating that the packet should be passed.

13. The system of claim 9 where the means for assigning a logical port number includes the step of:

means for assigning sequential logical port numbers to members of the port aggregation group.

14. The system of claim 9 further comprising, at each device included in the stack:

means for utilizing a provided destination index to represent a unique set of destination ports at the device.

15. The system method of claim 9 where means for associating a destination index with a received packet further comprises the step of:

means for prepending or appending a header including the destination index to the received packet.

16. The system of claim 9 where the means for providing the received packet and destination index to each potential destination in the stack comprises:

means for providing the received packet and destination index to every member of the stack.

17. A system for creating a cross-stack port aggregation group, said system comprising:

a network device having a plurality of ports, a controller coupled to the ports, and memory, accessible by the controller;

a port map, stored in memory, indicating which physical ports in the network device are included in the cross-stack port aggregation group;

a set of group masks, stored in memory, with a unique group mask for each port included in the cross-stack port aggregation group;

a forwarding table, stored in memory, for associating a destination index with a received packet;

management program code stored in memory;

with the controller configured to execute management software to utilize the forwarding table to associate a destination index with a first packet received at a port on the network devices and to provide providing the first packet and associated destination index to all potential destinations on a stack, and for a received packet, to utilize one or more fields in a received packet to generate a port selection index, to utilize a destination index associated with a received packet to access the port map, and to utilize the port selection index, port map, and group mask to determine whether to transmit the received packet on a selected port in the cross-stack port aggregation group.

18. The system of claim 17 where the controller is configured to form the CRC of one or more fields included in the received packet to form the port selection index.

19. The system of claim 17 where for a given bit position in the set of group masks only one group mask has a bit value indicating that the packet should be passed.

20. The system of claim 19 where the controller is configured to select a transmit bit position in the group mask for the selected port indicated by the port selection index and to transmit the received packet from a selected port if the bit in the transmit bit position has a bit value indicating the packet should be passed.

21. The system of claim 17 where the controller is configured to assign sequential logical port numbers to members of the port aggregation group.

22. The system of claim 17 where the controller is configured to associate the destination index with the first packet by prepending or appending a header including the destination index to the first packet.

* * * * *